US008127661B2

(12) United States Patent

Klotz et al.

(10) Patent No.: US 8,127,661 B2

(45) Date of Patent: Mar. 6, 2012

(54) HYDRAULIC SYSTEM

(75) Inventors: Stefan Klotz, Fontenay-Sous-Bois (FR); Gerard Hamel, Villejuif (FR); Joel Frelat, Paris (FR)

(73) Assignees: Universite Pierre et Marie Curie, Paris (FR); Centre National de la Recherche Scientifique, Paris (FR)

( * ) Notice: Subject to any disclaimer, the term of this patent is extended or adjusted under 35 U.S.C. 154(b) by 812 days.

(21) Appl. No.: 12/158,240

(22) PCT Filed: Dec. 18, 2006

(86) PCT No.: PCT/FR2006/051375

§ 371 (c)(1), (2), (4) Date: Oct. 15, 2008

(87) PCT Pub. No.: WO2007/074282

PCT Pub. Date: Jul. 5, 2007

(65) Prior Publication Data

US 2009/0091090 A1 Apr. 9, 2009

(30) Foreign Application Priority Data

Dec. 21, 2005 (FR) .................................... 05 13073

(51) Int. Cl.
*F15B 15/14* (2006.01)
*B01J 3/06* (2006.01)

(52) U.S. Cl. ........................................... 92/177; 92/248

(58) Field of Classification Search .................... 92/177, 92/248
See application file for complete search history.

(56) References Cited

U.S. PATENT DOCUMENTS

| | | | | |
|---|---|---|---|---|
| 3,841,644 | A * | 10/1974 | White | 277/468 |
| 4,056,341 | A * | 11/1977 | Moore | 425/77 |
| 6,502,880 | B1 * | 1/2003 | Sawdon | 92/177 |
| 7,487,710 | B2 * | 2/2009 | Takeshita et al. | 92/169.2 |

FOREIGN PATENT DOCUMENTS

| | | | |
|---|---|---|---|
| EP | 0 509 928 | A1 | 10/1992 |
| EP | 1 132 628 | A2 | 9/2001 |

OTHER PUBLICATIONS

Klotz et al., "A New Type of Compact Large-capacity Press for Neutron and X-Ray Scattering," High Pressure Research, vol. 24, No. 1, Mar. 2004, pp. 219-223.*

Klotz et al., "Angle-Dispersive Neutron Diffraction under High Pressure to 10 Gpa," *Applied Physics Letters*, Jan. 17, 2005, pp. 031917-031917.3.

* cited by examiner

*Primary Examiner* — Thomas E Lazo

(74) *Attorney, Agent, or Firm* — Oliff & Berridge, PLC

(57) ABSTRACT

The present invention relates to a hydraulic system that includes a compression chamber capable of being subjected to the pressure of a hydraulic fluid; a piston movable inside the compression chamber along an axis; and at least one sealing gasket disposed between the piston and a wall of the compression chamber, the gasket occupying an axial position that varies circumferentially around the axis in such a manner as to compensate for non-axially symmetrical stresses induced by the pressure of the fluid.

19 Claims, 2 Drawing Sheets

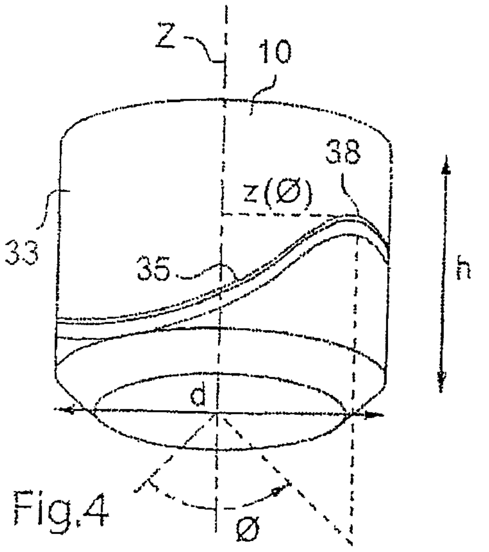
Fig.4
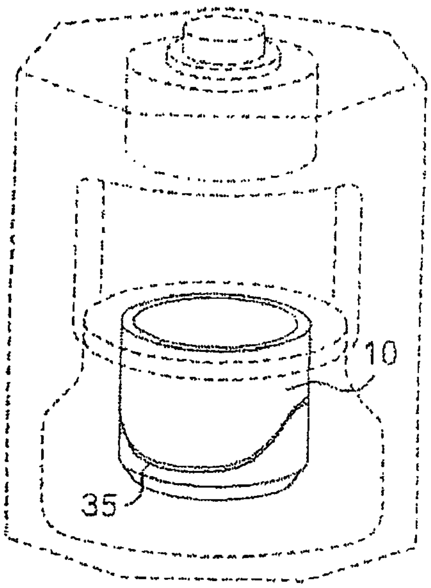
Fig.3
Fig.5
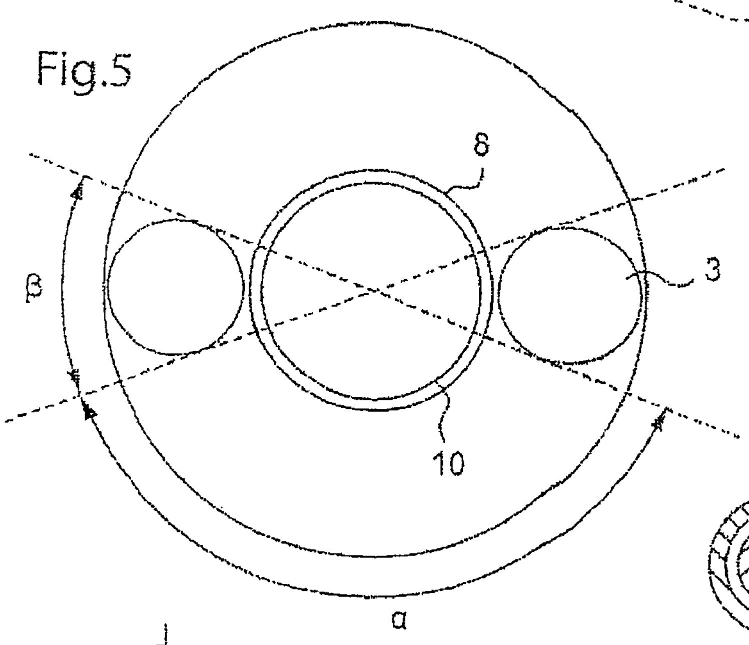
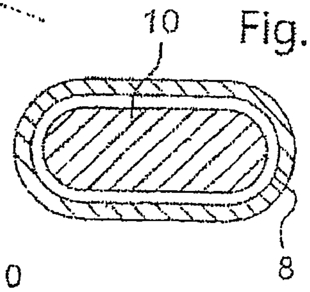
Fig.6
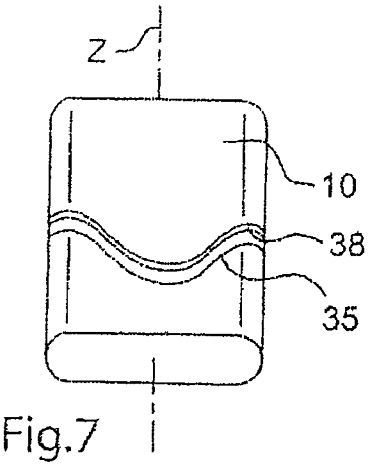
Fig.7
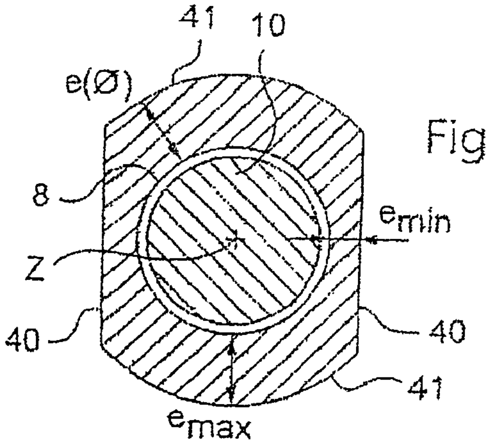
Fig.8

HYDRAULIC SYSTEM

The present invention relates to hydraulic systems, and more particularly to systems that operate with relatively high fluid pressures, e.g. pressures greater than or equal to 100 megapascals (MPa).

The invention relates more particularly to hydraulic systems comprising:

- a compression chamber capable of being subjected to the pressure of a hydraulic fluid;
- a piston movable inside the compression chamber along an axis; and
- at least one sealing gasket disposed between the piston and a wall of the compression chamber.

The pressure of the hydraulic fluid in the compression chamber serves to subject the piston to a force that can be used for moving the piston.

In certain fields of application, for reasons of size and weight, the hydraulic system needs to be compact and to present high capacity relative to its mass and its dimensions.

Such a compact hydraulic system can in particular satisfy the relationship $\eta \geqq 1$ (metric) tonne per kilogram to the power 3/2 ($t \cdot kg^{-3/2}$), with $\eta = Cm^{-3/2}$, where is the capacity (in tonnes) and m is the mass (in kg).

It is relatively difficult to construct such compact hydraulic systems, since the hydraulic system must be capable of accepting high fluid pressure without its ability to withstand that pressure being achieved to the detriment of its weight or of its dimensions.

Thus, in known compact hydraulic systems, the maximum fluid pressure is not as high as would be desirable, since otherwise the compression chamber would run the risk of deforming, thereby leaking hydraulic fluid, e.g. as a result of the sealing gasket failing by being extruded between the piston and the wall of the compression chamber.

An improvement that has been made to compact hydraulic systems consists in minimizing the deformation of the hydraulic system in the vicinity of the sealing gasket by giving the compression chamber a special shape. Such hydraulic systems are said to be self-compensating.

A self-compensating press is disclosed in European patent EP 0 509 928. That press has four traction members supporting the platform against which the piston bears, so that the stresses induced by the traction members are axially symmetrical.

A drawback of such a press is reduced accessibility to its central region, given the angle of the opening between traction members as seen from the axis of the press.

Presses with two traction members provide greater access, but they are limited in the pressure they can use because of the way the base portion deforms under the effect of the reaction from the traction members under load, which can give rise to stresses that are not axially symmetrical.

Furthermore, in certain applications, it can be desirable to benefit from hydraulic systems in which the wall of the compression chamber presents strength that is not constant, and in particular thickness that is not constant, and/or in which the piston does not present a cross-section that is circularly symmetrical, but that is flattened.

By way of example, this can make it possible to provide actuators of smaller thickness.

Unfortunately, with such pistons, the forces that act on the wall of the compression chamber are not axially symmetrical, and as a result, from a certain fluid pressure, the wall can become deformed, thereby impeding proper operation of the hydraulic system.

The invention seeks to propose an improved hydraulic system enabling the above-mentioned drawbacks to be remedied in full or in part.

The invention applies particularly but not exclusively to compact hydraulic systems.

In one of its aspects, the invention provides a hydraulic system comprising:

- a compression chamber capable of being subjected to the pressure of a hydraulic fluid;
- a piston movable inside the compression chamber along an axis; and
- at least one sealing gasket disposed between the piston and a wall of the compression chamber, the gasket occupying an axial position that varies circumferentially around the axis in such a manner as to compensate for non-axially symmetrical stresses induced by the pressure of the fluid.

Such compensation makes it possible to reduce the tendency of the wall of the compression chamber to ovalize, by locally increasing the force exerted by the fluid on the wall so as to oppose the stresses tending to deform it.

The compression chamber may be defined in a base portion of the hydraulic system, and the system may include a platform connected to the base portion by two traction members, the piston being arranged to exert a force towards the platform.

Where appropriate, the sealing gasket is placed in such a manner as to compensate for the non-axially symmetrical stresses induced by the reaction from the traction members under the effect of the force exerted by the piston on the platform.

By way of example, the two traction members can leave between the two openings, each of which occupies an angle lying in the range 130" to 150° in an equatorial plane around the axis Z.

The piston may support a first anvil and the platform may support a second anvil against which the first anvil can bear.

The piston may include a groove in which the sealing gasket is received.

This groove may be of undulating shape.

The undulations may present peaks, corresponding to a maximum distance from the end of the compression chamber, which peaks are situated substantially in register with the traction members.

The axial position $z(\phi)$ of the gasket may be given by the following formula:

$$z(\phi)=z_0+A\sin^4(\phi)$$

$\phi$ being the angle around the axis and $z_0$ and A being constants.

$z_0$ may lie in the range 0.1 h to 0.3 h, where h designates the height of the piston.

A may lie in the range 0.25 h to 0.4 h.

Other formulae can give similar variations in $z(\phi)$, and the invention is not limited to one particular formula.

The piston may have a greatest transverse dimension, in particular a diameter d, lying in the range 0.9 h to 1.1 h.

A greatest transverse dimension of the hydraulic system may lie in the range 1.1 to 1.5 times the greatest transverse dimension of the piston, in particular its diameter.

The sealing gasket may be positioned in such a manner that the relative variation in a greatest inside transverse dimension, in particular an inside diameter, of the compression chamber when the fluid pressure goes from atmospheric pressure to a pressure of 200 MPa, is less than or equal to 1 part in a thousand 1‰.

By way of example, while the hydraulic system is in operation, the fluid pressure may lie in the range 1 bar to 2500 bar, and in particular in the range 100 bar to 2500 bar.

The hydraulic system may include keying means enabling the piston to be positioned with a predefined angular orientation relative to the compression chamber.

The invention may also enable a hydraulic system to be made with a piston of cross-section that is not circularly symmetrical, that is capable of operating with relatively high fluid pressure, even in the event of the pressure of the fluid giving rise to stresses that are not axially symmetrical.

By way of example, its cross-section may have an aspect ratio lying in the range 1.1 to 4, where aspect ratio is defined as the ratio of its length divided by its width.

The invention can be better understood on reading the following detailed description of non-limiting embodiments thereof, and on examining the accompanying drawings, in which:

FIG. 3 is a perspective view showing in isolation the piston within the FIG. 1 hydraulic system;

FIG. 4 is another perspective view of the piston;

FIG. 5 is a diagrammatic plan view showing the access to the central region of the hydraulic system;

FIG. 6 is a diagrammatic and fragmentary cross-section of another example of a hydraulic system of the invention;

FIG. 7 is a diagrammatic perspective view of the piston of the FIG. 6 system; and FIG. 8 is a view similar to FIG. 6 showing a variant embodiment.

Figure 1:
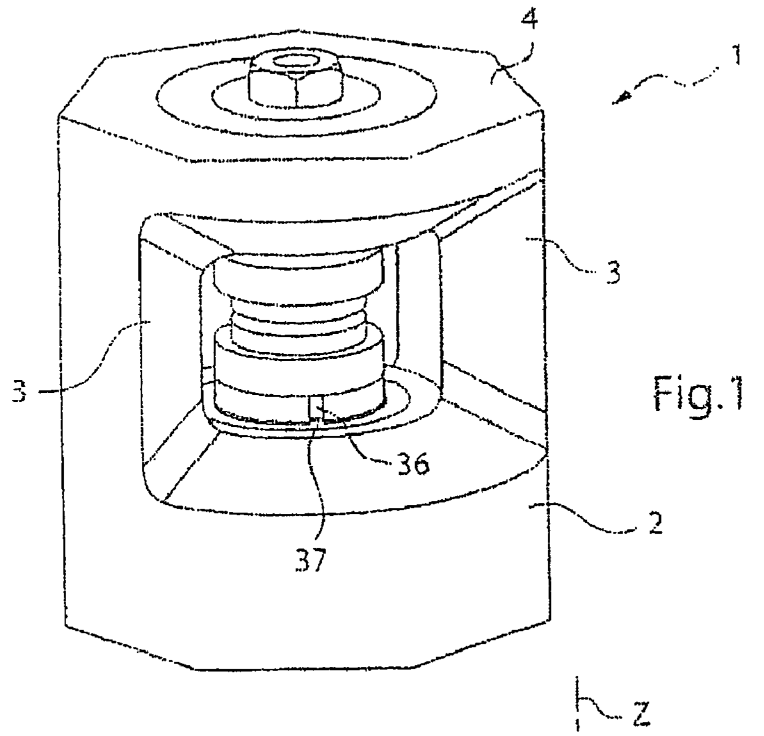
FIG. 1 is a diagrammatic perspective view showing an example of a hydraulic system of the invention.
Figure 2:
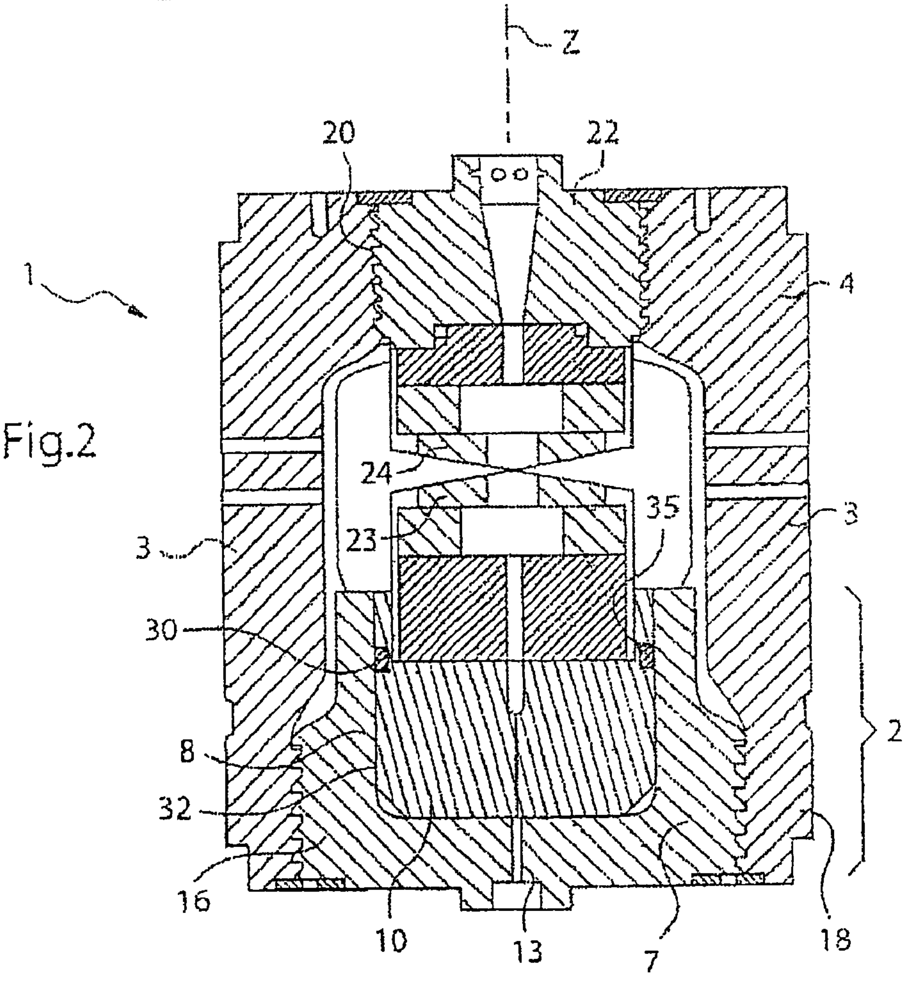
FIG. 2 is a longitudinal section of the FIG. 1 hydraulic system.

FIGS. 1 and 2 show a hydraulic system 1 made in accordance with the invention, e.g. in the form of a press having a base portion 2 connected by two tension members 3 to a top platform 4.

The base portion 2 includes a compression cylinder 7 that defines a compression chamber 8 in which a piston 10 can slide along an axis Z.

The compression chamber 8 may be fed with fluid under pressure via a duct 13 for connection to a pressure source.

The cylinder 7 has a bottom portion 16 that is enlarged and that has an outside thread.

The two tension members 3 are made integrally with the top platform 4 and with a mounting skirt 18 arranged to screw onto the bottom portion 16 of the cylinder 7.

The platform 4 includes a central housing 20 having an inside thread and receiving an insert 22 that is screwed therein.

The piston 10 supports a first anvil 23 and the insert 22 supports a second anvil 24 against which the first anvil 23 can bear when the piston 10 moves upwards, under the effect of fluid pressure.

By way of example, the anvils 23, 24 may carry at least one sample that is to be compressed by the press.

The press may be said to be compact, presenting a value for $\eta$ that is greater than or equal to 1.

In accordance with an aspect of the invention, a sealing gasket 30 is interposed between the piston 10 and the wall of the compression chamber 8 to prevent hydraulic fluid from leaking via the clearance that exists between the piston 10 and said wall.

In the example described, the compression chamber 8 is defined by a side surface 32 that is a body of revolution about the axis Z, and the piston 10 presents a facing side surface 33 that is likewise a body of revolution about the axis Z.

The sealing gasket 30 is housed in a groove 35 in the piston 10 that follows a curve that is not completely contained in a plane that is perpendicular to the axis Z.

In the example described, the groove 35 is of generally undulating shape, as can be seen in FIGS. 3 and 4 in particular, with its position $z(\phi)$ along the axis Z being given for example by the formula:

$$z(\phi)=z_0+A\sin^4(\phi)$$

Other formulae could lead to other acceptable positions $z(\phi)$.

The constants $z_0$ and A may be those defined above.

In the example shown, the peaks 38 of the undulations are situated substantially in register with the tension members 3.

In order to make such positioning possible, the piston may include at least a first portion in relief 36 (as shown in FIG. 1) for co-operating with a second portion in relief 37 of the base portion or of the tension members. In the example described, the piston has a longitudinal groove 36 extending parallel to the axis Z, acting as keying means, serving to receive a spline 37 formed on the top portion of the inside surface of the compression cylinder, above the gasket 30.

The undulating shape of the gasket 30 enables the pressure of the fluid contained in the compression chamber 8 to exert a force that is not axially symmetrical thereon, thereby compensating for the forces that are not axially symmetrically associated with the reaction from the tension members 3 on the base portion 2.

Thus, a relatively high fluid pressure can be used without ovalizing the compression chamber 8, and thus without extruding the gasket 30.

The invention is not limited to one particular shape for the gasket, and the gasket can be adapted by appropriate calculation, e.g. by finite elements, to the distribution of stresses acting on the compression chamber in operation.

The invention makes it possible to provide a press having two traction members that present access to its central region over an angle $\alpha$ that is relatively large when seen from the axis Z, as can be seen in FIG. 5. For example, the angle $\alpha$ may be about 140°, while the angle $\beta$ occupied by each tension member may occupy about 40°.

The invention applies not only to making a compact press having two tension members, but also to making an actuator in which the piston 10 presents, for example, a cross-section that is not circularly symmetrical, in particular a cross-section that is flattened, as shown in FIG. 6.

In such a hydraulic system, the forces acting on the wall of the compression chamber are not axially symmetrical and they can deform it.

By acting on the axial position of the gasket as a function of angle about the axis, as shown in FIG. 7, it is possible to improve the distribution of stresses and to enable operation with a higher fluid pressure.

The invention also applies to circumstances in which a press or an actuator has a compression chamber 8 that is defined by a wall that presents strength that is not constant about the axis Z, in particular thickness $e(\phi)$ that is not constant, e.g. because of the presence of two outside opposite plane faces 40 united by faces 41 constituting surfaces of revolution about the axis Z.

By way of example, the ratio $e_{max}/e_{min}$ may be greater than or equal to 1.1, or 1.2, or 1.5, or 2, or even more.

The non-constant thickness e may enable a hydraulic system, in particular an actuator, to be provided in which the base portion presents a configuration that is compact.

With varying wall thickness, the piston 10 can present a cross-section that is circular, as shown in FIG. 8, as can the surface facing the compression chamber 8, while in a variant that is not shown, the piston 10 may present a cross-section that is not circular, e.g. being oblong in shape.

The invention is not limited to the embodiments described above.

For example, the sealing gasket may be housed in a groove formed in the side surface of the compression chamber.

The piston may be a single piece or it may be made up by assembling together a plurality of parts, with the same applying to the base portion, to the traction members, and to the top platform.

The sealing gasket may be an O-ring as shown, or any other kind of gasket enabling the desired sealing to be obtained.

Where appropriate, the piston may include more than one sealing gasket.

The hydraulic fluid may be oil or any other liquid.

The expression "comprising a" should be understood as being synonymous with "comprising at least one" unless specified to the contrary, and the expression "lying in the range" should be understood as including the end values.

The invention claimed is:

1. A hydraulic system comprising:

a compression chamber for receiving a hydraulic fluid under pressure;

a piston movable inside the compression chamber along an axis; and at least one sealing gasket disposed between the piston and a wall of the compression chamber, the gasket occupying an axial position that varies circumferentially around the axis to compensate for non-axially symmetrical stresses induced by the pressure of the fluid, wherein the piston includes a groove of undulating shape in which the sealing gasket is received.

2. A hydraulic system according to claim 1, the compression chamber being defined in a base portion and the hydraulic system including a platform connected by two traction members to the base portion, the piston being arranged to exert a force towards the platform, the sealing gasket being disposed in such a manner as to compensate for the non-axially symmetrical stresses induced by the reaction from the traction members under the effect of the force exerted by the piston on the platform.

3. A hydraulic system according to claim 2, the two traction members leaving between them two openings of angular extent lying in the range 130° to 150° in an equatorial plane about the axis.

4. A hydraulic system according to claim 1, the piston including a first anvil and a platform including a second anvil against which the first anvil can bear.

5. A hydraulic system according to claim 1, an axial position $z(\phi)$ of the gasket being given by the following formula:

$$z(\phi)=z_0+A\sin^4(\phi)$$

$\phi$ being the angle about the axis and $z_0$ and A being constant.

6. A hydraulic system according to claim 5, in which $z_0$ lies in the range 0.1 h to 0.3 h, where h designates a height of the piston.

7. A hydraulic system according to claim 5, in which A lies in the range 0.25 h to 0.4 h, where h designates a height of the piston.

8. A hydraulic system according to claim 1, the piston having a greatest transverse dimension, lying in the range 0.9 h to 1.1 h, where h designates a height of the piston.

9. A hydraulic system according to claim 1, a greatest transverse dimension of the hydraulic system lying in the range 1.1 to 1.5 times a greatest transverse dimension of the piston.

10. A hydraulic system according to claim 1, the sealing gasket being positioned in such a manner that the relative variation of an inner maximum transverse dimension of the compression chamber when the pressure of the fluid passes from atmospheric pressure to a pressure of 200 MPa, is less than or equal to ±1‰.

11. A hydraulic system according to claim 1, in which $\eta \geqq 1$ $t \cdot kg^{-3/2}$, where $\eta = Cm^{-3/2}$, C being the capacity in tonnes of the hydraulic system and m being its mass in kg.

12. A hydraulic system according to claim 1, the piston presenting a cross-section that is not circularly symmetrical.

13. A hydraulic system according to claim 12, the cross-section of the piston presenting an aspect ratio lying in the range 1.1 to 4.

14. A hydraulic system according to claim 1, the compression chamber being defined by a wall of strength that is not constant.

15. A hydraulic system according to claim 14, a thickness of the wall $e(\phi)$ varying with a ratio $e_{max}/_{min} \geqq 1.1$.

16. A hydraulic system according to claim 1, the pressure of the fluid lying in the range 1 bar to 2500 bar.

17. A hydraulic system according to claim 1, further comprising keying means enabling the piston to be positioned with predefined angular orientation relative to the compression chamber.

18. A hydraulic system comprising:

a compression chamber for receiving a hydraulic fluid under pressure;

a piston movable inside the compression chamber along an axis; and at least one sealing gasket disposed between the piston and a wall of the compression chamber, the gasket occupying an axial position that varies circumferentially around the axis to compensate for non-axially symmetrical stresses induced by the pressure of the fluid, wherein:

the compression chamber is defined in a base portion and the hydraulic system includes a platform connected by two traction members to the base portion, the piston is arranged to exert a force towards the platform, and the sealing gasket is disposed in such a manner as to compensate for the non-axially symmetrical stresses induced by the reaction from the traction members under the effect of the force exerted by the piston on the platform, and the piston includes a groove of undulating shape in which the sealing gasket is received, the undulating shape presenting peaks, corresponding to maximum departure from the end of the compression chamber and disposed substantially in register with the traction members.

19. A hydraulic system comprising:

a compression chamber for receiving a hydraulic fluid under pressure;

a piston movable inside the compression chamber along an axis; and at least one sealing gasket disposed between the piston and a wall of the compression chamber, the gasket occupying an axial position that varies circumferentially around the axis to compensate for non-axially symmetrical stresses induced by the pressure of the fluid, the axial position being given by the following formula:

$$z(\phi)=z_0+A\sin^4(\phi)$$

$\phi$ being the angle about the axis and $z_0$ and A being constants, wherein the compression chamber is defined in a base portion and the hydraulic system includes a platform connected by two traction members to the base portion, the piston is arranged to exert a force towards the platform, the sealing gasket is disposed in such a manner as to compensate for the non-axially symmetrical stresses induced by the reaction from the traction members under the effect of the force exerted by the piston on the platform, and the piston includes a groove of undulating shape in which the sealing gasket is received, the undulating shape presenting peaks, corresponding to maximum departure from the end of the compression chamber and disposed substantially in register with the traction members.

* * * * *